Figure 9:
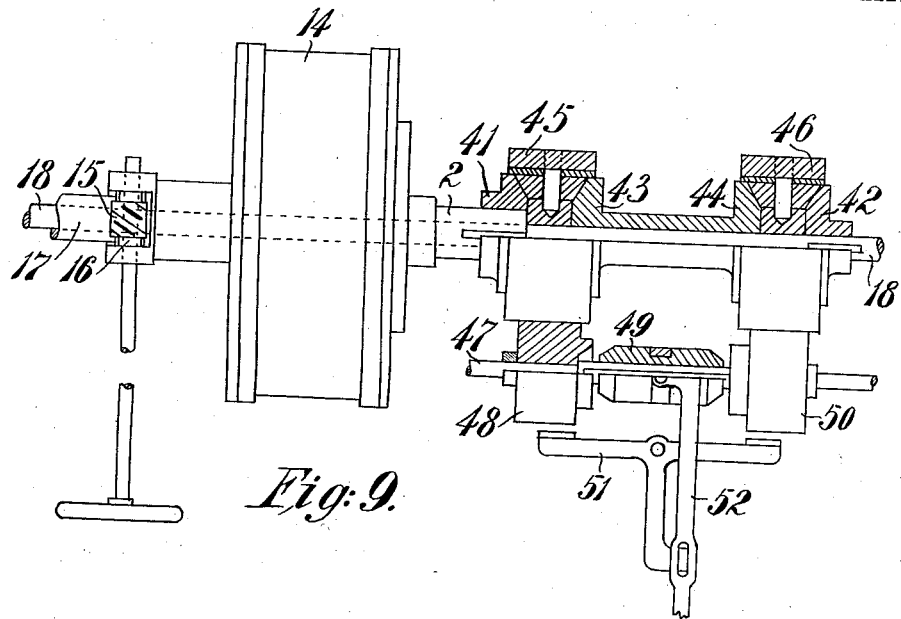

J. J. MYERS.
VARIABLE SPEED GEARING.
APPLICATION FILED APR. 29, 1911.
1,047,551.
Patented Dec. 17, 1912.
3 SHEETS—SHEET 1.
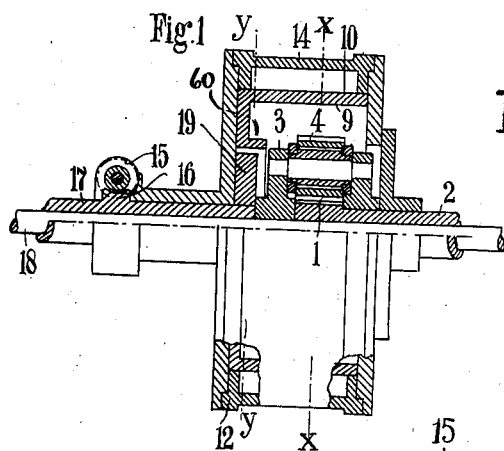
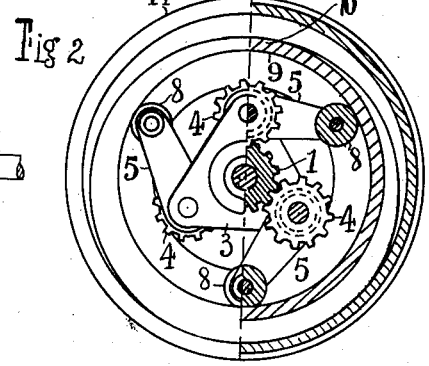
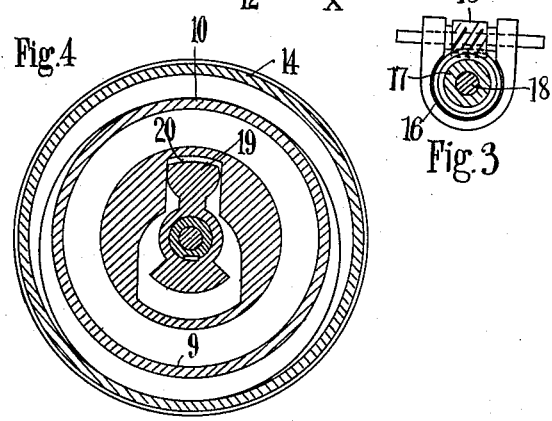
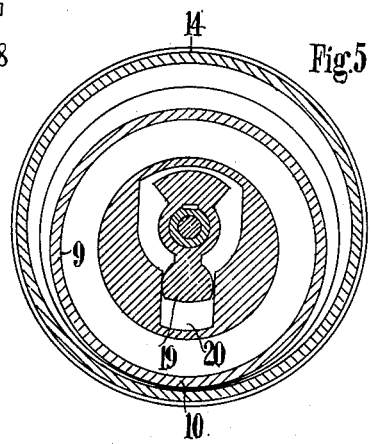
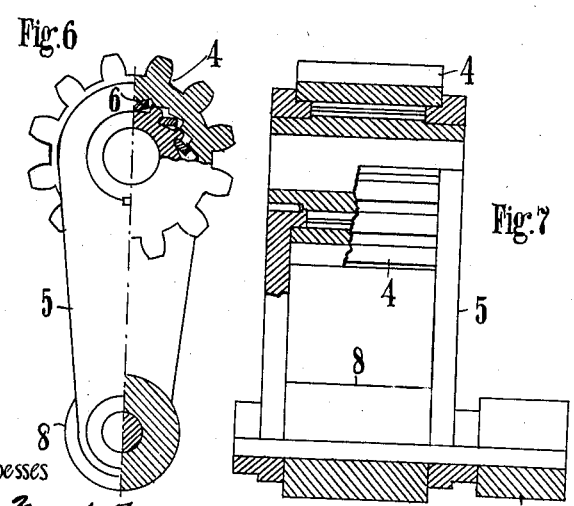
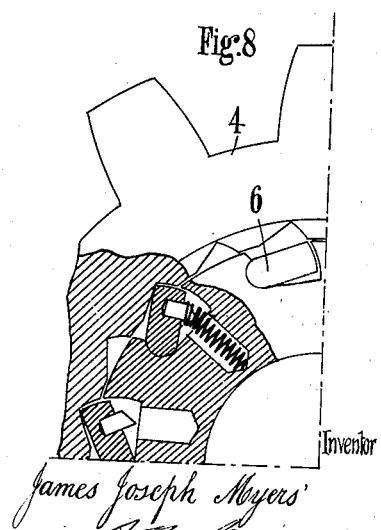
Witnesses
M. K. Freeman
N. C. Loental
Inventor
James Joseph Myers
per
Attorney.

J. J. MYERS.
VARIABLE SPEED GEARING.
APPLICATION FILED APR. 29, 1911.

1,047,551.

Patented Dec. 17, 1912.
3 SHEETS—SHEET 2.

Witnesses.
Russell L. Stevens
M. N. Freeman

Inventor.
James Joseph Myers.
per
A. N. Bunn
Attorney.

J. J. MYERS.
VARIABLE SPEED GEARING.
APPLICATION FILED APR. 29, 1911.
1,047,551.
Patented Dec. 17, 1912.
3 SHEETS—SHEET 3.
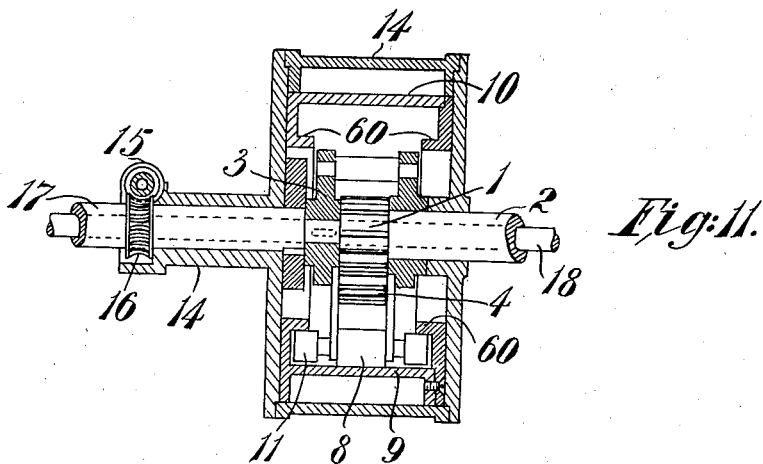
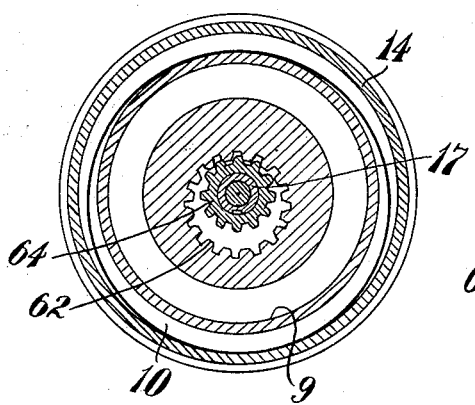
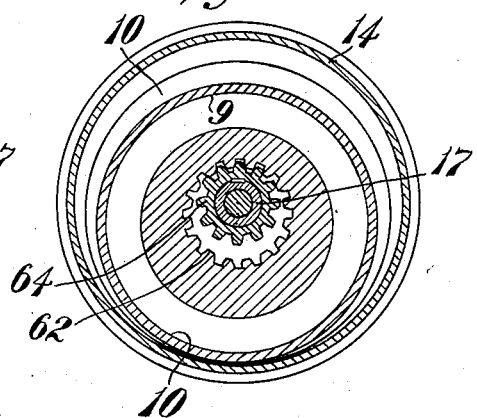
Witnesses.
Russell L. Stevens
M. K. Freeman
Inventor.
James, Joseph, Myers.
per
A. M. Brunn
Attorney.

UNITED STATES PATENT OFFICE.

JAMES JOSEPH MYERS, OF THURLES, IRELAND.

VARIABLE-SPEED GEARING.

1,047,551.  Specification of Letters Patent.  Patented Dec. 17, 1912.

Application filed April 29, 1911. Serial No. 624,050.

*To all whom it may concern:*

Be it known that I, JAMES JOSEPH MYERS, a subject of the King of Great Britain, residing at Grallagh House, Thurles, county Tipperary, Ireland, have invented new and useful Improvements in Variable-Speed Gearing, of which the following is a specification.

The present invention is designed to provide an improved means of changing the speed of a driven shaft to any desired degree between zero and a maximum in either direction while the driving shaft is running at a constant speed, applicable for transmitting power from any source such as an engine, a turbine, or an electromotor whether stationary or on a vehicle or vessel; also for use on cranes; for altering the cutting speeds or feeds of machine tools; for altering the rate of distribution on machines for distributing materials; or for any purpose for which a variable speed gearing may be required.

My invention relates to improvements in variable speed gearing of that class in which a sun wheel engages with a number of planet pinions mounted on a spider and controlled through free wheel or one-way clutches by lever arms whose ends are maintained on a circular track which may be brought from a position concentric with the sun wheel to positions of varying eccentricity, a variable difference of the velocities of spider and sun wheel being thus obtainable.

In variable speed gearing of the class referred to as usually constructed, the spider and sun wheel rotate and the ends of the arms attached to the one-way clutch mechanisms are constrained to follow a circular track or roller path, the center of said path remaining fixed for each particular speed ratio; the speed of the driven part being equal to that of the driver when the path is concentric with the sun wheel and increasing with the eccentricity of the path.

In the specification of my patent application No. 624049 filed the 29th April 1911 I describe the use in this class of variable speed gearing of a balanced rotating variable throw eccentric by which the speed of a driven shaft may be varied to any degree between zero and a maximum with either a fixed spider carrying the planet pinions or a fixed sun wheel. It may be desirable (for instance, with high driving shaft speeds, when the ratio of the speed of the driving shaft to the maximum speed of the driven shaft is high or when it is desired to dispense with the mechanism for altering the eccentricity of the roller path while its center is rotating) to operate the gearing with the center of the roller path fixed for each particular speed of the driven shaft.

If the driving shaft were connected to the spider and the driven shaft to the sun-wheel, or the driving shaft to the sun wheel and the driven shaft to the spider, the arrangement would be equivalent to the usual form of eccentrically operated "epicyclic" or "sun and planet" variable speed gearing—the ratio of the speed of the driven shaft to that of the driver could be varied from unity upward, but the driven shaft could not be driven at a lower speed than the driver.

According to the present invention a method is provided of imparting to a driven shaft a speed variable between zero and a maximum from two revolving parts the ratio of whose speeds may be varied from unity while one of them runs at constant speed. This method consists in connecting a bevel wheel of a differential gearing to one of the revolving parts, a bevel wheel of a second differential gearing to the other revolving part and connecting the two remaining bevel wheels together. Then if one of the planet rings is fixed a speed varying from zero to a maximum may be imparted to the other planet ring by altering the speed ratio of the two revolving parts from unity, one of these parts continuing to revolve at constant speed.

The invention is illustrated by way of example in the accompanying drawings in which—

Figure 10:
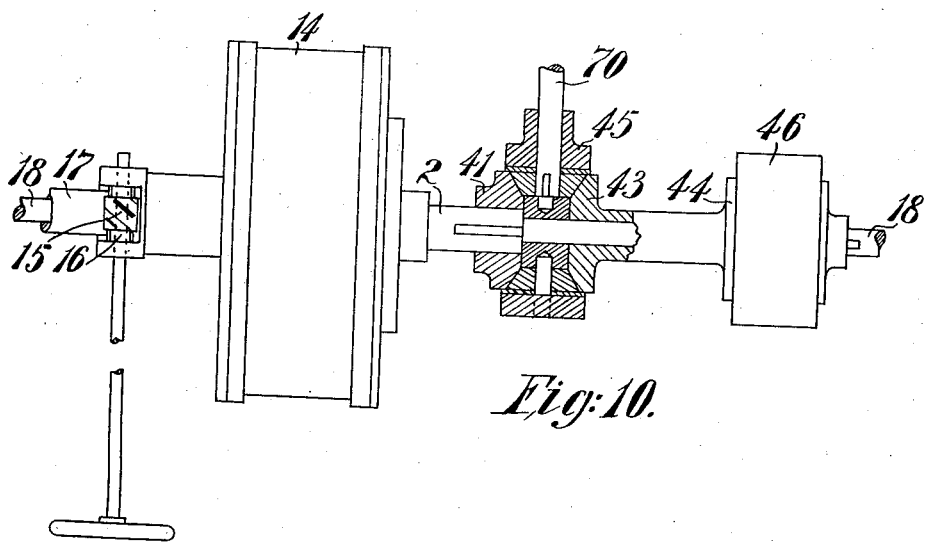

Figure 1 shows a side view partly in section of the eccentric variable speed gearing. Fig. 2 shows an end view with the cover removed and partly a sectional view on the line X—X of Fig. 1. Fig. 3 shows a detail view of the worm gearing for turning the eccentric cam wheel or roller path. Figs. 4 and 5 show end sectional views on the line Y—Y of Fig. 1. Figs. 6 and 7 show detail views of a planet pinion with its free wheel hub, pair of lever arms, and rollers. Fig. 8 shows details of one form of one-way clutch or free wheel hub mechanism that might be used. Fig. 9 shows a differential gearing and clutch mechanism driven through gearing shown in Figs. 1 and 2 for obtaining any speed from zero to a maximum in both directions. Fig. 10 shows a differential gearing driven through the gearing shown in Figs. 1 and 2 for obtaining the speed variable in one direction only. Fig. 11 shows an alternative construction of eccentric cam wheel or roller path in the eccentric variable speed gearing shown in Figs. 1 and 2, and Figs. 12 and 13 show a spur wheel instead of a balanced lever for changing the position of the roller path in its casing.

Referring now to the drawings, a sun and planet train, composed of a sun-wheel 1 and of a number of planet wheels 4 mounted on one-way clutch mechanisms or free wheel hubs pivoted on a spider 3 is encircled by a cam wheel 10 whose inner surface 9 bears against the rollers 8 pivoted between pairs of lever arms 5 attached to the free wheel hubs of the planet pinions 4. Other rollers 11 bear simultaneously on a shoulder 60 shown in Fig. 1 formed on the cam wheel 10.

The spider 3 is attached to a shaft 18 and the sun-wheel is integral with a sleeve or hollow shaft 2; or, alternatively, the sun-wheel is attached to the shaft 18 and the spider to a sleeve; or the central shaft 18 may be divided and the spider attached to one part and the sun wheel to the other.

The cam wheel 10 is contained in a casewheel 14 the interior of which is eccentric to the sunwheel to the same extent that the exterior of the cam wheel is eccentric to its interior. A balanced lever 19 engaging in a slot 20 in the cam-wheel 10 is attached to a sleeve 17 which may be turned relatively to the case wheel 14 by means of a worm 15 mounted on the case wheel 14 and engaging with a worm wheel 16 integral with the sleeve 17.

The case wheel 14 is fixed to or forms part of the frame of the machine. The eccentricity of the roller path 9 is altered by turning the worm wheel 15 by means of a handwheel on its spindle or otherwise. It is clear from the known properties of this class of gearing that if the driving shaft is connected to the spider 3 and the driven shaft to the sun wheel 1 or if the driving shaft is connected to the sun wheel 1 and the driven shaft to the spider 3, then the speed of the driven shaft will be equal to that of the driving shaft when the roller path is concentric with the sun wheel but will gradually increase if the roller path is gradually brought to its position of maximum eccentricity; in other words, according as the eccentricity of the roller path increases from zero to a maximum the ratio of the speed of the driven shaft to the speed of the driving shaft will increase from unity to a maximum.

In Fig. 9 it is shown how a speed gradually variable from zero to a maximum may be imparted to the driven shaft. Of the bevel wheels 41 and 42 one is rigidly connected to the sun wheel 1 through the hollow shaft 2 while the other is rigidly connected to the spider 3 through the shaft 18; and bevel wheels 43 and 44 are rigidly connected together by being attached to the ends of a sleeve or otherwise. A ring of planet wheels 45 is adapted to mesh with the bevel wheels 41 and 43 and a ring of planet wheels 46 is adapted to mesh with the bevel wheels 42 and 44. As the difference in the speeds of the wheels 41 and 42 is increased by increasing the cam wheel or eccentricity of the roller path 10, if the ring 45 is fixed a speed increasing from zero to a maximum will be imparted to the ring 46; or if the ring 46 is fixed a speed increasing from zero to a maximum will be imparted to the ring 45, but in the opposite direction.

If a speed variable from zero to a maximum in one direction only is required, the arrangement shown in Fig. 10 may be used in which one of the rings is permanently fixed and the other connected with the mechanism to be driven. In this case the driving shaft 70 could be connected to one of the planet wheels of the fixed ring 45 instead of to the spider 3 or the sun wheel 1.

If a variable speed in both directions is required an arrangement may be made for fixing either of the rings at will and connecting the other ring simultaneously to the shaft to be driven. The driven shaft 47 has loosely mounted thereon wheels 48 and 50 in mesh with the planet rings 45 and 46. The said shaft 47 has slidingly mounted thereon a double friction or claw clutch 49 adapted to clutch either the wheel 48 or the wheel 50 to the said driven shaft 47.

A lever 51 is provided with brake blocks or detents or the like at its ends adapted to respectively engage with the wheels 48 and 50. This lever 51 is operated by a lever 52 by means of which the clutch 49 can be moved to couple either one of said wheels 48 or 50 to the driven shaft 47, and simultaneously to fix the other of said wheels and the corresponding planet wheel ring by means of one or other of the brake blocks or detents at the end of the lever 51.

As shown in Fig. 11 the cam wheel or roller path 10 may be provided with two shoulders 60 and rollers 11 may be arranged on both sides of the lever arms 5 adapted to rest on said shoulders simultaneously with the rollers 8 resting on the surface 9 of said roller path. The latter construction may conveniently be used with the pawls arranged so that the working pressure bears upon said shoulders 60 instead of on the cylindrical surface 9 of said cam wheel 10.

As shown in Figs. 12 and 13 a spur wheel 61 on the sleeve 17 in mesh with an annular ring of teeth 62 cut on or fixed to the cam wheel 10 concentric with its outside circumference may be substituted for the balanced lever 19 shown in Figs. 4 and 5.

What I claim is:

1. In a variable speed gearing the combination of a central shaft, a hollow shaft concentric with said central shaft, means for rotating said shafts, a bevel wheel rigidly mounted on said central shaft, a bevel wheel rigidly mounted on said concentric shaft, a pair of bevel wheels mounted on the ends of a sleeve mounted loosely on said central shaft, a ring of pinion wheels adapted to mesh with said bevel wheel mounted on said central shaft and with one of said loose sleeve bevel wheels, a second ring of pinion wheels adapted to mesh with said bevel wheel mounted on said concentric shaft and the bevel wheel at the other end of said loose sleeve, a driven shaft, means for locking one of said rings of pinion wheels and means for connecting the other ring of pinion wheels with said driven shaft.

2. In a variable speed gearing the combination of a central shaft, a hollow shaft concentric with said central shaft, means for rotating said shafts, a bevel wheel rigidly mounted on said central shaft, a bevel wheel rigidly mounted on said concentric shaft, a pair of bevel wheels mounted on the ends of a sleeve mounted loosely on said central shaft, a ring of pinion wheels adapted to mesh with said bevel wheel mounted on said central shaft and with one of said loose sleeve bevel wheels, a second ring of pinion wheels adapted to mesh with said bevel wheel mounted on said concentric shaft and the bevel wheel at the other end of said loose sleeve, a driven shaft, a pair of wheels loosely mounted on said driven shaft in mesh with said rings of pinion wheels, a double clutch slidingly mounted on said driven shaft between said loose wheels adapted to clutch one or the other of said loose wheels to the driven shaft, a lever provided with engaging members at its ends adapted to respectively engage with said loose wheels, a second lever operating said engaging lever through which said clutch can be moved to couple one of said loose wheels to the driven shaft and simultaneously to fix the other loose wheel and its corresponding ring of pinion wheels by means of one or the other of the engaging members at the ends of said first lever.

3. In a variable speed gearing the combination of a central shaft, a central gear wheel mounted on said central shaft, pinion wheels adapted to engage said central gear wheel, a spider carrying said pinion wheels, lever arms controlling said pinion wheels through one way clutches, a fixed eccentric track in engagement with the ends of said lever arms, a bevel wheel rigidly connected to said central gear wheel, a bevel wheel rigidly connected with said spider, a pair of bevel wheels mounted on the ends of a sleeve mounted loosely on said central shaft, a ring of pinion wheels adapted to mesh with said bevel wheel connected with said central gear wheel and with one of said loose sleeve bevel wheels and a second ring of pinion wheels adapted to mesh with said bevel wheel, connected with said spider, and the bevel wheel at the other end of said loose sleeve, a driven shaft, means for locking one of said rings of pinion wheels and means for connecting the other ring of pinion wheels with said driven shaft.

4. In a variable speed gearing the combination of a central shaft, a central gear wheel mounted on said central shaft, pinion wheels adapted to engage said central gear wheel, a spider carrying said pinion wheels, lever arms controlling said pinion wheels through one way clutches, a fixed eccentric track in engagement with the ends of said lever arms, a bevel wheel rigidly connected to said central gear wheel, a bevel wheel rigidly connected with said spider, and a pair of bevel wheels mounted on the ends of a sleeve mounted loosely on said central shaft, a ring of pinion wheels adapted to mesh with said bevel wheels connected with said central gear wheel and with one of said loose sleeve bevel wheels, a second ring of pinion wheels adapted to mesh with said bevel wheel connected with said spider and the bevel wheel at the other end of said loose sleeve, a driven shaft, a pair of wheels loosely mounted on said driven shaft in mesh with said rings of pinion wheels, a double clutch slidingly mounted on said driven shaft between said loose wheels adapted to clutch one or other of said loose wheels to the driven shaft, a lever provided with engaging members at its ends adapted to respectively engage with said loose wheels, a second lever operating said engaging lever through which said clutch can be moved to couple one of said loose wheels to the driven shaft and simultaneously to fix the other loose wheel and its corresponding ring of pinion wheels by means of one or the other of the engaging members at the ends of said first lever.

5. In a variable speed gearing the combination of a central shaft, a central gear wheel mounted on said central shaft, pinion wheels adapted to engage said central gear wheel, a spider carrying said pinion wheels, lever arms controlling the said pinion wheels through one way clutches, rollers at the ends of said lever arms, a fixed eccentric roller path encircling said pinion wheels and said central gear wheel and in engagement with the rollers at the ends of said lever arms, a bevel wheel rigidly connected to said central gear wheel, a bevel wheel rigidly connected with said spider and a pair of bevel wheels mounted on the ends of a sleeve mounted loosely on said central shaft, a ring of pinion wheels adapted to mesh with said bevel wheel connected with said central gear wheel and with one of said loose sleeve bevel wheels and a second ring of pinion wheels adapted to mesh with said bevel wheel connected with said spider and the bevel wheel at the other end of said loose sleeve, a driven shaft, means for locking one of said ring of pinion wheels and means for connecting the other ring of pinion wheels with said driven shaft.

6. In a variable speed gearing the combination of a central shaft, a central gear wheel mounted on said central shaft, pinion wheels adapted to engage said central gear wheel, a spider carrying said pinion wheels, lever arms controlling the said pinion wheels through one way clutches, rollers at the ends of said lever arms, fixed eccentric roller path encircling said pinion wheels and said central gear wheel and in engagement with the rollers at the ends of said lever arms and having a circular shoulder projecting from said roller path, secondary rollers at the ends of said lever arms adapted to bear against said circular shoulder, a bevel wheel rigidly connected with said spider, and a pair of bevel wheels mounted on the ends of a sleeve mounted loosely on said central shaft, a ring of pinion wheels adapted to mesh with said bevel wheel and with one of said loose sleeve bevel wheels and a second ring of pinion wheels adapted to mesh with said bevel wheel connected with said spider and the bevel wheel at the other end of said loose sleeve, a driven shaft, means for locking one of said ring of pinion wheels and means for connecting the other ring of pinion wheels with said driven shaft.

In testimony whereof I have signed my name to this specification in the presence of two subscribing witnesses.

JAMES JOSEPH MYERS.

Witnesses:
  JAMES SMITH,
  DENIS DESMOND.